INVENTOR
NELSON SEVERINGHAUS

ATTORNEYS

United States Patent Office 3,623,233
Patented Nov. 30, 1971

3,623,233
METHOD AND APPARATUS FOR DRYING DAMP PULVERANT MATERIALS BY ADSORPTION
Nelson Severinghaus, 213 Glenn Circle,
Decatur, Ga. 30030
Filed Dec. 3, 1969, Ser. No. 881,743
Int. Cl. F26b 3/00
U.S. Cl. 34—9
14 Claims

ABSTRACT OF THE DISCLOSURE

Method and apparatus for drying pulverized materials at ambient temperature wherein the method includes placing an adsorbent directly in contact with the material through a porous medium for a predetermined period of time to adsorb the water from the material and subsequently removing the water-laden adsorbent from the material. The apparatus of the invention comprises, in the first embodiment, conveying means for supporting and transporting the pulverized material, a porous medium for carrying the adsorbent in contact with the material for a predetermined length of time, and means for supplying the material to the conveying means and adsorbent to the porous medium. The second embodiment of the apparatus includes means for mixing the material with the adsorbent and means for subsequently separating the adsorbent from the material.

BACKGROUND OF THE INVENTION

Field of invention

This invention relates to improved techniques of drying damp or wet pulverized solid materials. More particularly, this invention is concerned with the drying wet or damp pulverized solid materials by admixture or juxtapositioning of a quantity of inert and insoluble granule solids of high adsorption capacity, such as "molecular sieves" described in U.S. Pats. 2,882,243, 2,882,244, and 3,130,007, or diatomite or silica gel, or activated alumina with damp or wet pulverized solids to be dried. If the adsorbent is mixed with the pulverized material, then the adsorbent is separated from the pulverized material by well known techniques such as screening, gravity or magnetic separation. This invention further relates to the drying of damp or wet pulverized solids by a continuous technique whereby adsorbent or disiccant materials such as "molecular sieves," silica gel or activated alumina are placed close to the damp or wet solids while they are traveling on a belt or vibrating pan and whereby the adsorbent or desiccant and solids to be dried are separated by a water vapor porous and adsorbent belt or screen and discharged separately after drying has taken place.

This invention contemplates, in several of its embodiments, the provision that the water loaded adsorbent will be reactivated for reuse by well known methods of heat or vacuum.

DESCRIPTION OF PRIOR ART

Most wet processed industrial pulverized minerals and many processed foods are dried to a level suitable for shipping or use by application of heat in order to evaporate excess moisture from the product. These processes generally use a variety of devices such as cylindrical dryers, rabble hearths, traveling grates and "fluid bed" driers and hence suffer from the disadvantages of mechanical maintenance problems, temperature control problems, fuel consumption and dust loss problems. It is here contemplated that these problems can be eliminated or minimized by the processes of my invention. In heat evaporation drying processes, temperature variations frequently are the cause of undesirable changes in the products being dried, for example, in calcination of limestone or hemical modification of foods. My invention eliminates this difficulty by transferring moisture at approximately ambient temperature to an adsorbent which is then separately treated for reuse or put to other uses.

In heat drying finely pulverized calcite ($CaCo_3$) it is difficult to attain the desired level of dryness (less than 0.15% water) without using temperatures which cause some calcination. Higher moisture levels or the presence of calcine ($CaO$) in the dried product are detrimental in many uses as fillers and extenders.

Using the process of the present invention, I have achieved a moisture content in finely pulverized calcite as low as 0.03% without substantial temperature rise (less than 50° F.) and hence my invention will eliminate such difficulties.

It is well known that in heat induced evaporative drying, larger granular size solids are more readily dried than pulverized solids due to the larger volume of voids in the granular materials which allow better passage of water vapor from the solids. Thus, when, as in my method, moisture is transferred from pulverized to granular solids so that only the granular solids need be heat dried, there is a resulting economy of fuel. As fuel costs are a large proportion of the total costs in most drying methods being used for pulverized materials, my invention leads to lower drying costs.

SUMMARY OF THE INVENTION

Accordingly, it is an object of this invention to provide a technique for effectual drying of damp or wet pulverized solids, which technique minimizes degradation or contamination of said solids.

It is a further object of this invention to provide a technique for continuously drying damp or wet pulverized solids, whereby heat, fuel and labor costs are minimized.

Another object of this invention is to provide means for indirect contact between a pulverized material and an adsorbent through a porous adsorbent medium.

A still further object of the invention is to provide a technique for drying pulverized material at ambient temperature.

Another object of the invention is to provide means for mixing a pulverized material with an adsorbent and subsequently separating the material from the adsorbent.

These and other objects have now herein been obtained by the process in which the adsorbent granules are deposited onto a water porous conveyor belt which is placed into contact with said wet pulverized solids which are carried on a second conveyor belt; and a second embodiment dry water-adsorbent granules are admixed with water-wet pulverized solids for a time and at a temperature sufficient to provide transfer of moisture from said pulverized solids to said adsorbent granules, thereafter separating and recovering said pulverized solids from said adsorbent granules.

DETAILED DESCRIPTION OF PREFERRED EMBODIMENTS

Figure 1:
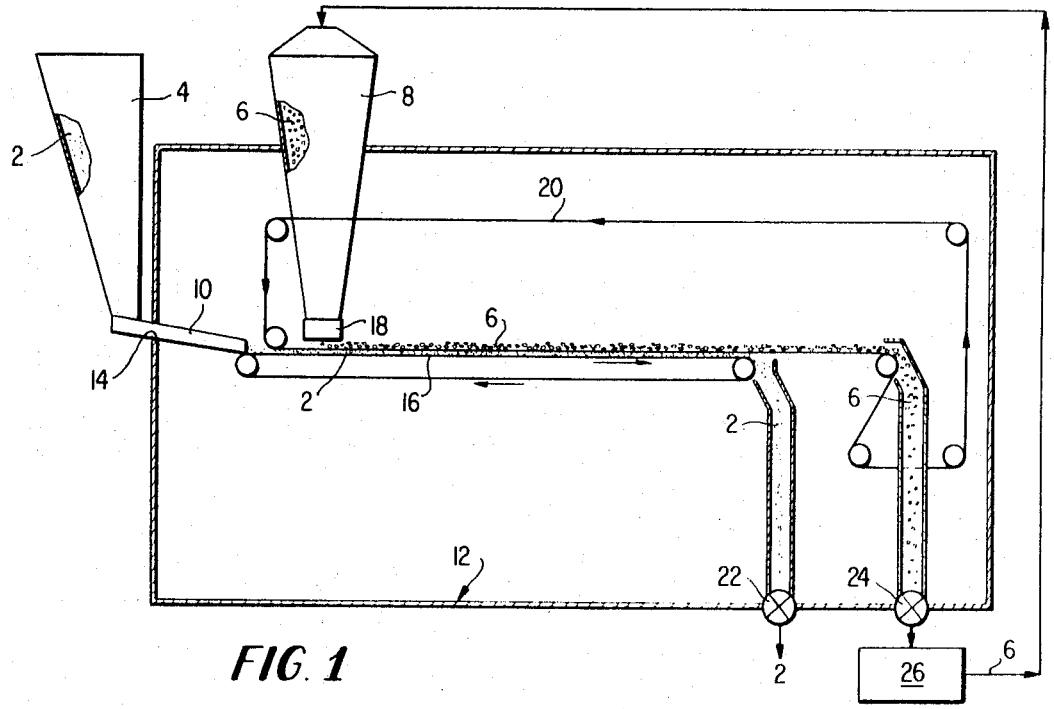
FIG. 1 is a diagrammatic elevation view of one emmodiment of this invention in which the granular adsorbent is placed into close juxtaposition with the wet pulverized solids.

One form of this invention is shown in FIG. 1. This form would be preferred where any unseparated admixture of adsorbent with dried solids is detrimental to the product or where a higher density caked dried product is desirable for packaging and shipping characteristics.

In the elevation view of FIG. 1, the damp or wet pulverized solids 2 to be dried, are contained in bin 4. Free-flowing, activated adsorbent or desiccant particles 6, such as "molecular sieves" are contained in an air locked bin 8 which will prevent excessive adsorption of air moisture into the dry adsorbent 6. A closed controllable rate feeder-spreader 10 is fitted through the walls of air-tight housing 12 by means of flexible seals 14. One suitable rate feeder-spreader is a vibrating pan. The spreader 10 functions to place a uniform thickness of damp or wet material 2 on traveling flat belt 16. The characteristics of belt 16 may be varied, depending upon the particular material being dried and the particular arrangement of this part of the apparatus. Where it is desirable to apply heat to accelerate the adsorption drying, the belt 16 can be composed of thin steel sheet and heat can be applied directly to the underside of the belt along its loaded run. If heat is applied, the temperature should be adjusted so as not to damage the product or the adsorbent. Usually, temperatures of less than 50° F. are sufficient. Where heating is not desired, this belt can be composed of an air and water porous adsorbent material which is capable of retaining the solids.

A rate-controllable feeder 18 similar to the feeder-spreader 10 evenly distributes dry adsorbent 6 across the width of an upper belt 20 which travels in the same direction and at the same speed as the lower belt 16. In this apparatus, belt 20 travels on the bed of the damp solid material 2 carried by belt 16. Belt 20 may be formed from an adsorbent material which is porous to water vapor. One example of a suitable belt material is woven cotton. The lower belt 16 may be driven by a variable speed drive so that the juxtaposition time between the desiccant particles 6 carried by the upper belt 20 and the wet pulverized solids 2 carried by the lower belt 16 is sufficient to achieve the desired degree of drying and the desired transfer of moisture. The upper belt 20 may be driven by frictional contact with the damp pulverized material 2 moving on the lower belt 16, or it may have an auxiliary power source connected to one of its pulleys.

The entire conveyor system for drying is enclosed in an air excluding housing 12. The dried pulverized solids 2 are discharged through housing 12 by means of an air lock 22, such as a rotating valve. Water loaded adsorbent 6 is similarly discharged through a second air lock 24. The pulverant dried material is then ready for packaging or for further processing. Water loaded adsorbent 6 is heat treated in regenerator 26, such as a traveling grate drier, to reactivate it for reuse.

Figure 2:
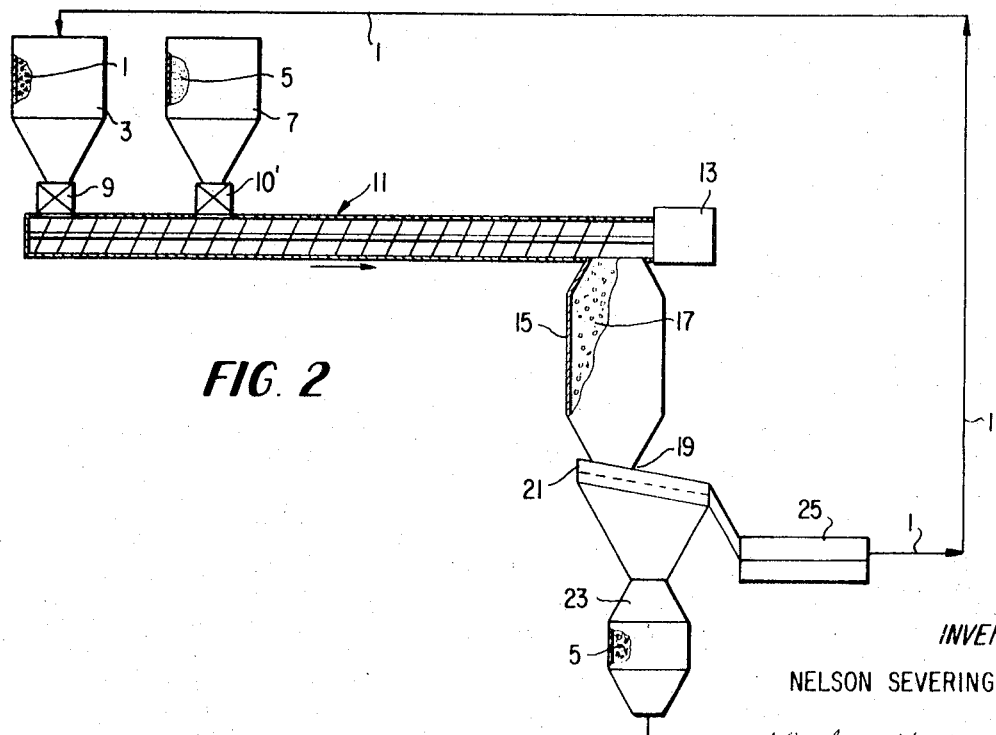
FIG. 2 is a diagrammatic elevation view of another form of this invention in which the pulverized solids are admixed with the granular adsorbent.

In a second embodiment, as shown in FIG. 2, granular adsorbent or dessicant 1 is coated or treated to prevent degradation in the mixing and drying process and to promote a clean subsequent separation. The material is contained in a partially air locked bin 3 which prevents excessive moisture adsorption from the surrounding air while awaiting use in the drier. Wet or damp pulverized solids 5 to be dried are held in bin 7. Feed rate control devices 9 and 10, such as variable vibration pans, are provided to feed proper proportions of adsorbent 1 and material 5. The proportions of each are adjusted in accordance with the particular adsorbent granules 1 and the particular moisture content of the damp pulverized solids 5. An enclosed screw or paddle mixture-transporter 11 is provided and is driven by a power drive (not shown). The admixture 17 of granules 1 and pulverized solids 5 are deposited in an enclosed bin 15 which is suitably dimensioned so as to retain the mix and allow sufficient adsorption time to achieve the desired dryness of pulverized solids at outlet 19. The mixture 17 is fed from the outlet 19 to a screening surface 21 with screen apertures of such size that the now water loaded granular adsorbent 1 is retained while the dried pulverized material 5 passes through the screen.

When magnetic adsorbent is used, magnetic separation may be substituted for the screen. The dried material 5 is then placed into bin 23 for further processing or shipping. The water loaded adsorbent is thereafter passed through regenerator 25 such as a heated grate drier and returned to the air locked bin 3 for reuse.

Having generally described the invention, the following examples are provided for illustration only and are not intended to be limiting in any manner.

EXAMPLE 1

Using the apparatus and method of FIG. 1, the following results were obtained: 25 grams of a paste of very finely ground marble containing about 20% by weight water was spread to a ¼ inch thickness on the bottom of an air-tight jar, covered with an adsorbent cotton cloth and then covered with 40 grams of activated 1/16 inch molecular sieves to a depth of ¾ of an inch. Moisture removal from the marble cake was measured at various time intervals, and it was noted as follows:

| Minutes: | Percent of contained water |
|---|---|
| 15 | 48 |
| 30 | 70 |
| 45 | 90 |
| 60 | 100 |

This indicates a maximum belt travel time of one hour to completely dry ¼ inch thickness of difficult-drying paste containing 20% by weight of water.

EXAMPLE 2

Using the apparatus and technique of FIG. 2, the following results were obtained: a mix of equal weight of 1/16 inch activated "molecular sieves" and —30 mesh marble containing 8.25% moisture were retained in a closed vessel for two hours. The marble moisture content was then measured and found to be reduced to a level of about 0.00% by weight.

In order to further minimize contamination by the adsorbent granules after separation and to minimize abrasion damage during the contacting process, it has been found to be advantageous to apply a water-porous abrasive-resistant coating, such as silica gel, onto said granules prior to contact with the pulverized solids. The abrasive-resistant coating can also be used in combination with an inert magnetic material such as magnetite to enable magnetic separation of non-magnetic dried product.

It should be recognized that many modifications and variations can be made to the subject invention without departing from the spirit or scope thereof.

What is claimed and intended to be covered by Letters Patent is:

1. A method for drying damp or wet pulverized solids including the steps of:
   (a) introducing said pulverized solids into a system of ambient atmosphere;
   (b) introducing granular desiccant solids into said ambient atmosphere in the region of said pulverized solids, said granular solids detailed for removing moisture from said atmosphere and from said pulverized solids; and
   (c) maintaining said desiccant granular solids in the region of said pulverized solids within said ambient atmosphere for a sufficient period of time to remove a predetermined amount of moisture from said pulverized solids.

2. The process of claim 1, including a further step of separating and recovering the dried pulverized solids from the moisture-containing desiccant granular solids.

3. The process of claim 2, wherein said separation is obtained by screening, magnetic separation or gravity separation.

4. The process of claim 2, wherein said granular adsorbent solids are coated with an abrasion-resistant material prior to mixing with said pulverized solids, so as to minimize contamination of said dried pulverized solids after separation from said granular solids.

5. The process of claim 4, wherein said abrasion-resistant coating material is silica gel.

6. The process of claim 4, wherein said abrasion-resistant coating contains an inert magnetic solid which facilitates the separation of said dried pulverized solids from said granular solids by magnetic separation.

7. The process of claim 1, wherein said finely pulverized solids is calcium carbonate which is dried to a level of less than about 0.05% by weight moisture.

8. A method for continuously drying wet or damp pulverized solids which comprises depositing said pulverized solids onto a first conveyor, depositing adsorbent granular solids onto a second water-porous conveyor, wherein said second conveyor is in contact with said pulverized solids for a time sufficient to permit transfer of moisture from said pulverized solids to said granular solids, separating and recovering said pulverized solids from said second conveyor.

9. The process of claim 8, wherein transfer of moisture from said pulverized solids to said granular solids is accelerated by the direct application of heat to said first conveyor at a temperature which is insufficient to alter or damage the pulverized solids.

10. The process of claim 8, wherein said dried pulverized solids are recovered in the form of a solid composite, having a bulk density of approximately twice that of loose pulverized solids thereby facilitating packaging and shipping.

11. The process of claim 8, wherein the moisture containing granular adsorbents are heat dried after separation in order to reactivate said adsorbent for reuse in said process.

12. Apparatus for drying pulverized material with a granular adsorbent comprising:
   a first conveyor;
   hopper means for storing and supplying the pulverized material to said first conveyor;
   a porous adsorbent medium selectively positionable in contact with the material on said first conveyor;
   supply means for storing and supply the granular adsorbent to that side of said medium opposite the side thereof in contact with said material.

13. Apparatus as set forth in claim 12 further including regeneration means for receiving the water-laden adsorbent from said medium, removing the water from the adsorbent and returning the adsorbent to said supply means.

14. Apparatus as set forth in claim 12 wherein said medium is woven cloth belt.

References Cited
UNITED STATES PATENTS

| | | | |
|---|---|---|---|
| 1,083,279 | 1/1914 | Hermann | 34—95 |
| 2,423,309 | 7/1947 | Gary | 34—9 X |
| 2,561,442 | 7/1951 | Lyon, Jr., et al. | 34—9 |
| 2,882,609 | 4/1959 | Templeton | 34—9 |

JOHN J. CAMBY, Primary Examiner